(12) United States Patent
Higley et al.

(10) Patent No.: US 12,298,569 B2
(45) Date of Patent: May 13, 2025

(54) GUIDE PIN HOLDER FOR GUIDE PINS IN AN ADAPTER

(71) Applicant: US Conec, Ltd, Hickory, NC (US)

(72) Inventors: Jason Higley, Hickory, NC (US); Darrell R. Childers, Hickory, NC (US); Craig M. Conrad, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 908 days.

(21) Appl. No.: 17/292,415

(22) PCT Filed: Nov. 14, 2019

(86) PCT No.: PCT/US2019/061396
§ 371 (c)(1),
(2) Date: May 7, 2021

(87) PCT Pub. No.: WO2020/102489
PCT Pub. Date: May 22, 2020

(65) Prior Publication Data
US 2022/0011526 A1    Jan. 13, 2022

Related U.S. Application Data

(60) Provisional application No. 62/767,347, filed on Nov. 14, 2018.

(51) Int. Cl.
*G02B 6/38*    (2006.01)
(52) U.S. Cl.
CPC ......... *G02B 6/3882* (2013.01); *G02B 6/3825* (2013.01)
(58) Field of Classification Search
CPC ....................................................... G02B 6/38
(Continued)

(56) References Cited

U.S. PATENT DOCUMENTS 5,867,621 A * 2/1999 Luther ................. G02B 6/3825
                                                      385/59
5,915,058 A * 6/1999 Clairardin ............ G02B 6/3885
                                                      385/70

(Continued)

FOREIGN PATENT DOCUMENTS

CN      1118443 C      9/2002
CN      2888467 Y      4/2007

(Continued)

OTHER PUBLICATIONS

CN 1st OA dated Oct. 25, 2023.
Written Opinion of the International Searching Authority; Mar. 10, 2020, 6 pages.

*Primary Examiner* — Kaveh C Kianni
(74) *Attorney, Agent, or Firm* — Michael L. Leetzow PLLC; Shubhrangshu Sengupta

(57) ABSTRACT

A guide pin insert for an adapter to align two fiber optic connectors includes a central body having an opening configured to allow two fiber optic ferrules to mate therethrough, the opening having a longitudinal axis therethrough, a first guide pin holder in communication with the opening on a first side of the central body to engage a first guide pin, a second guide pin holder in communication with the opening on a second side of the central body to engage a second guide pin, a third guide pin holder spaced from the first guide pin holder along the longitudinal axis to engage the first guide pin, and a fourth guide pin holder spaced from the second guide pin holder along the longitudinal axis to engage the second guide pin.

10 Claims, 9 Drawing Sheets

(58) Field of Classification Search
USPC .......................................................... 385/52
See application file for complete search history.

(56) References Cited

U.S. PATENT DOCUMENTS

| | | | | |
|---|---|---|---|---|
| 6,076,975 | A * | 6/2000 | Roth | G02B 6/3825 385/60 |
| 6,079,881 | A * | 6/2000 | Roth | G02B 6/3869 385/139 |
| 6,149,313 | A | 11/2000 | Giebel et al. | |
| 6,154,597 | A * | 11/2000 | Roth | G02B 6/3825 385/139 |
| 6,200,040 | B1 * | 3/2001 | Edwards | G02B 6/3806 385/59 |
| 6,240,229 | B1 * | 5/2001 | Roth | G02B 6/3825 385/53 |
| 6,247,850 | B1 * | 6/2001 | Edwards | G02B 6/3806 385/98 |
| 6,331,079 | B1 * | 12/2001 | Grois | G02B 6/3897 385/60 |
| 6,357,928 | B1 * | 3/2002 | Haley | G02B 6/3893 385/59 |
| 6,371,657 | B1 * | 4/2002 | Chen | G02B 6/3893 385/139 |
| 6,406,192 | B1 * | 6/2002 | Chen | H01R 13/6315 439/248 |
| 6,505,976 | B1 * | 1/2003 | Grois | G02B 6/3882 385/71 |
| 6,669,377 | B2 | 12/2003 | Barnes et al. | |
| 9,144,917 | B1 * | 9/2015 | Gregorski | G02B 6/25 |
| 9,684,139 | B2 * | 6/2017 | Chang | G02B 6/3826 |
| 10,114,179 | B2 * | 10/2018 | Kamada | G02B 6/38 |
| 10,725,249 | B2 | 7/2020 | Higley et al. | |
| 2001/0007603 | A1 | 7/2001 | Sakurai et al. | |
| 2002/0025125 | A1 * | 2/2002 | Williams | G02B 6/43 385/139 |
| 2002/0031313 | A1 * | 3/2002 | Williams | G02B 6/3885 385/139 |
| 2002/0186932 | A1 * | 12/2002 | Barnes | G02B 6/3885 385/60 |
| 2003/0223703 | A1 * | 12/2003 | Chen | G02B 6/3897 385/78 |
| 2004/0017983 | A1 * | 1/2004 | Chen | G02B 6/3849 385/78 |
| 2004/0130703 | A1 | 7/2004 | Brown et al. | |
| 2004/0131317 | A1 * | 7/2004 | Grzegorzewska | G02B 6/3887 385/86 |
| 2004/0152354 | A1 | 8/2004 | Luther et al. | |
| 2004/0171298 | A1 | 9/2004 | Matasek et al. | |
| 2005/0069264 | A1 * | 3/2005 | Luther | G02B 6/3821 385/59 |
| 2006/0067628 | A1 * | 3/2006 | Suzuki | G02B 6/3885 385/59 |
| 2006/0153504 | A1 * | 7/2006 | Suzuki | G02B 6/389 385/55 |
| 2006/0280408 | A1 * | 12/2006 | Anderson | G02B 6/38875 385/100 |
| 2009/0046981 | A1 * | 2/2009 | Margolin | G02B 6/3825 385/70 |
| 2010/0129031 | A1 * | 5/2010 | Danley | G02B 6/3885 385/59 |
| 2013/0028560 | A1 * | 1/2013 | Arnold | G02B 6/3885 156/247 |
| 2013/0136401 | A1 * | 5/2013 | Cooke | G02B 6/3636 385/83 |
| 2013/0236142 | A1 * | 9/2013 | Fabian | G02B 6/3878 385/78 |
| 2014/0044396 | A1 * | 2/2014 | Wakjira | G02B 6/38 385/77 |
| 2016/0349459 | A1 * | 12/2016 | Collier | G02B 6/3849 |
| 2016/0349464 | A1 * | 12/2016 | Chang | G02B 6/3825 |
| 2017/0102505 | A1 * | 4/2017 | Nguyen | G02B 6/3869 |
| 2017/0160486 | A1 * | 6/2017 | Krawczyk | G02B 6/3893 |
| 2017/0192180 | A1 * | 7/2017 | Andrus | G02B 6/3821 |
| 2017/0315308 | A1 * | 11/2017 | Kamada | G02B 6/3898 |
| 2018/0164513 | A1 * | 6/2018 | Fabian | G02B 6/3878 |
| 2018/0210153 | A1 * | 7/2018 | Daily | G02B 6/3861 |
| 2018/0335581 | A1 * | 11/2018 | Wong | G02B 6/381 |
| 2019/0137700 | A1 * | 5/2019 | Takano | G02B 6/3893 |
| 2019/0154930 | A1 * | 5/2019 | Ho | G02B 6/4256 |
| 2019/0353852 | A1 * | 11/2019 | Lee | G02B 6/3825 |
| 2020/0064564 | A1 * | 2/2020 | Ho | G02B 6/3887 |
| 2020/0341209 | A1 * | 10/2020 | Higley | G02B 6/3849 |
| 2021/0263228 | A1 * | 8/2021 | Takano | G02B 6/3885 |

FOREIGN PATENT DOCUMENTS

| | | |
|---|---|---|
| CN | 102033268 B | 5/2014 |
| CN | 102830465 B | 9/2014 |
| CN | 107834329 A | 3/2018 |
| EP | 3579031 A1 | 12/2019 |
| JP | H0634845 B | 1/2003 |
| KR | 1019990061184 A | 7/1999 |

* cited by examiner

GUIDE PIN HOLDER FOR GUIDE PINS IN AN ADAPTER

REFERENCE TO RELATED CASE

This application claims priority under 35 U.S.C. § 119 (e) to provisional application No. 62/767,347 filed on Nov. 14, 2018, the contents of which are hereby incorporated by reference in their entirety.

BACKGROUND OF THE INVENTION

In optical links, such as those found in Next Generation Data Centers ("NGDCs"), fiber optic ferrules mate with each other using high tolerance guide pins. The guide pins are usually metallic (e.g., high precision steel) and are expensive relative to other parts of the optical connection. Usually, an adapter is used to receive and align mating fiber optic ferrules from opposing ends thereof. Typically, a fiber optic ferrule is designated as a male fiber optic ferrule because it includes the guide pins, and the mating fiber optic ferrule is the female with guide pin openings. There are times that the gender of one of the fiber optic ferrules needs to be changed to properly mate with the mating fiber optic ferrule. For example, two male-type fiber optic ferrules with guide pins cannot mate, requiring that the pins have to be removed (if possible) for mating with the other fiber optic ferrule. If there are two female fiber optic ferrules, then one of the fiber optic ferrules needs to have guide pins inserted.

An example of a conventional fiber optic connector adapter having guide pins therein is disclosed in U.S. Pat. No. 5,867,621 (621 patent). A similarly shaped guide pin holder can also be used with a fiber optic connector is illustrated in U.S. Pat. No. 6,669,377. Certain other adapters have receptacles that are press-fit into internal features of an adapter to align the fiber optic ferrules themselves rather than by guide pins (see, e.g., U.S. Patent Application Publication No. 2004/0171298).

While guide pins are very useful in aligning fiber optic ferrules installed in fiber optic connectors as the fiber optic connectors are inserted into an adapter, there are issues. One issue is that the user has to have the correct orientation or gender of the fiber optic connectors. It is difficult, if not impossible, to change the gender of a fiber optic connector in the field. Therefore, the user must order a higher number of fiber optic connectors to ensure that the correct fiber optic connectors are available. Even if the user has the correct number of fiber optic connectors, it can be difficult to align the guide pins with the guide pin holes in the fiber optic ferrules. Other problems with the use of guide pins in the fiber optic ferrule are discussed in the '621 patent.

As noted above, the use of guide pins with an adapter is known. However, those adapters also present problems with aligning the fiber optic ferrules and connectors. The '621 patent uses two halves of an adapter with a mount secured between the halves. There may be issues with the planarity of the mount and the planarity and depth of cavities in each of the halves. The guide pin is held in the mount by an interference snap fit into the cut outs of the mount. There is some float that allows for the guide pins to have angular cocking of the guide pins. If the user is not careful, the guide pins may not align with the guide pin holes, causing stubbing or damage to the front face of the fiber optic ferrule.

In order to prevent such issues and to better ensure alignment, a new guide pin holder that can be used in an adapter been designed. The guide pins are disposed inside the adapter body and hold the guide pins securely during the optical fiber ferrule mating process. This technology helps to move away from the burden of ordering the correct gender of the fiber optic connector, from ordering tools to change the gender of the connector (by removing or adding pins), and generally from changing the gender of the connector. One or more aspects of this application may be used in a fiber optic connection system, including where two fiber optic connectors are connected inside an adapter.

SUMMARY OF THE INVENTION

The present invention is directed to a guide pin insert for an adapter to align two fiber optic connectors that includes a central body having an opening configured to allow two fiber optic ferrules to mate therethrough, the opening having a longitudinal axis therethrough, a first guide pin holder in communication with the opening on a first side of the central body to engage a first guide pin, a second guide pin holder in communication with the opening on a second side of the central body to engage a second guide pin, a third guide pin holder spaced from the first guide pin holder along the longitudinal axis to engage the first guide pin, and a fourth guide pin holder spaced from the second guide pin holder along the longitudinal axis to engage the second guide pin.

In some embodiments, the third guide pin holder is at an end of a first cantilevered plate attached to a first side of the central body and fourth guide pin holder is at an end of a second cantilevered plate attached to a second side of the central body.

In some other embodiments, the first and second cantilevered plates are connected to the main body by an elastic portion.

In another embodiment, the guide pin holders have a curved portion, the curved portions have a cross section, the cross section of the first and second guide pin holders being smaller that the cross section of the third and fourth guide pin holders.

According to another aspect of the present invention, there is an adapter to mate two fiber optic connectors, each of the fiber optic connectors having a fiber optic ferrule with at least one guide pin opening therein, that includes a main body extending from a first end to a second end, an opening extending between the first and second ends to receive respective fiber optic connectors therein, a first guide pin holder in communication with the opening from a first side of the adapter, a second guide pin holder in communication with the opening from a second side of the adapter, a third guide pin holder extending into the opening from the first side of the adapter and adjacent to the first guide pin holder, and a fourth guide pin holder extending into the opening from the second side of the adapter and adjacent to the second guide pin holder.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE INVENTION

Figure 1:
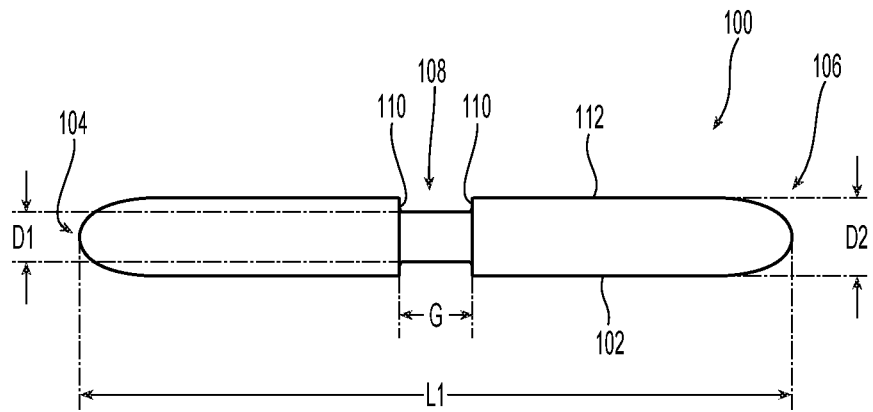
FIG. 1 is an elevational view of one embodiment of a guide pin for use with a guide pin insert and an adapter according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

One embodiment of a guide pin 100 according to the present invention is illustrated in FIG. 1. The guide pin 100 can be used with one embodiment of a guide pin insert 130 according to the present invention as shown in FIGS. 2-10. The guide pin 100 has a generally cylindrical pin body 102 and extends for a length L1 between a first end 104 and a second end 106. In a center portion of the guide pin 100 is a pin groove 108 that extends a length G along the guide pin 100 and is preferably centered between the first and second ends. The pin groove 108 is also preferably cylindrical in cross section, with a diameter D1 that is smaller than a diameter D2 of the guide pin 100 at the pin body 102. There is a transition 110 from the pin groove 108 to the pin body 102. The transition 110 from the pin groove 108 to the cylindrical pin body 102 may be a flat surface or shoulder 110. The transition 110 may also have a portion that is a flat surface disposed closer to the surface of the pin groove 108 and then a chamfered, sloping, or rounded portion that transitions into an outer surface 112 of the pin body 102. The pin groove 108 may also have a configuration (cross section) other than round, e.g., a flat portion, an oval cross section, a square or rectangular cross section and still fall within the scope of the present invention. While only one pin groove 108 is illustrated, more than one pin groove is within the scope of the present invention.

The ends 104,106 of the guide pin 100 have an end profile that may vary in shape. They could be generally spherical or may have a configuration according to one or more of the pin head profiles discussed for example in U.S. patent application Ser. No. 15/948,786, titled "Non-Ferrule Damaging Field Removable Guide Pin," filed by the Applicant on Apr. 9, 2018, and incorporated by reference in its entirety herein.

Figure 8:
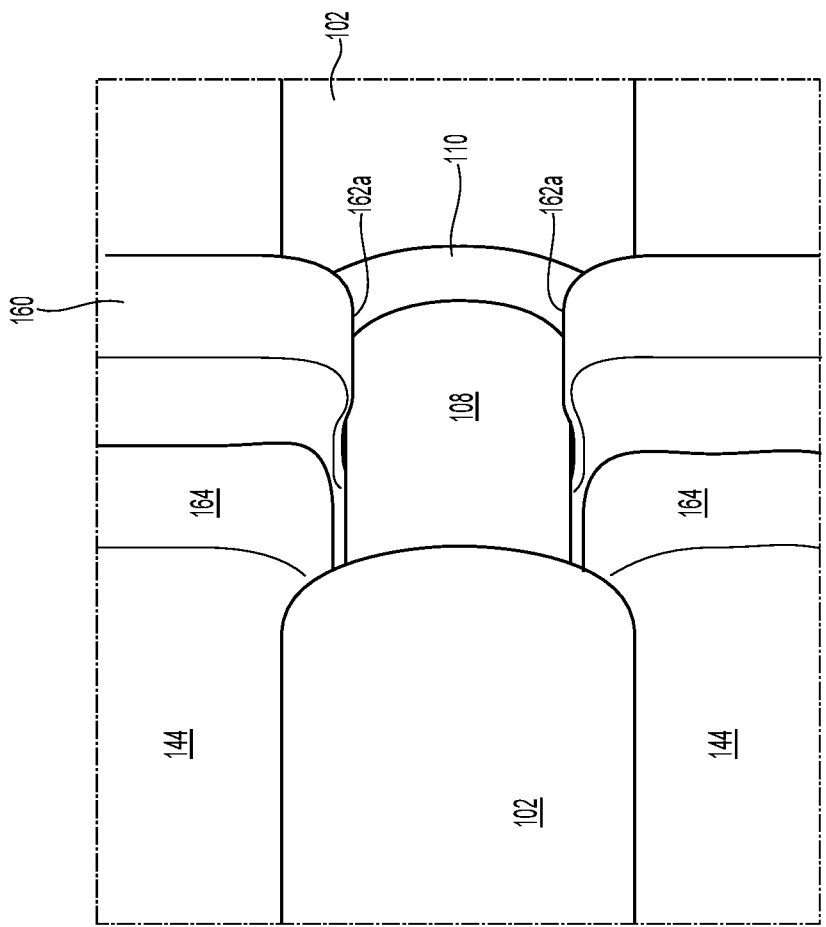
FIG. 8 is a partial perspective view of the guide pin of FIG. 1 installed in the guide pin insert of FIG. 2.
Figure 10:
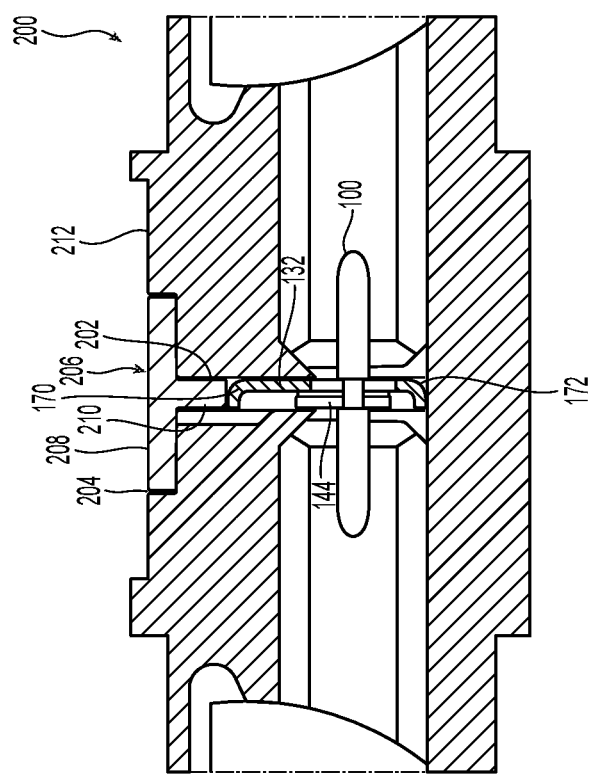
FIG. 10 is a cross sectional view of the adapter and guide pin insert along the line 10-10 in FIG. 9.
Figure 9:
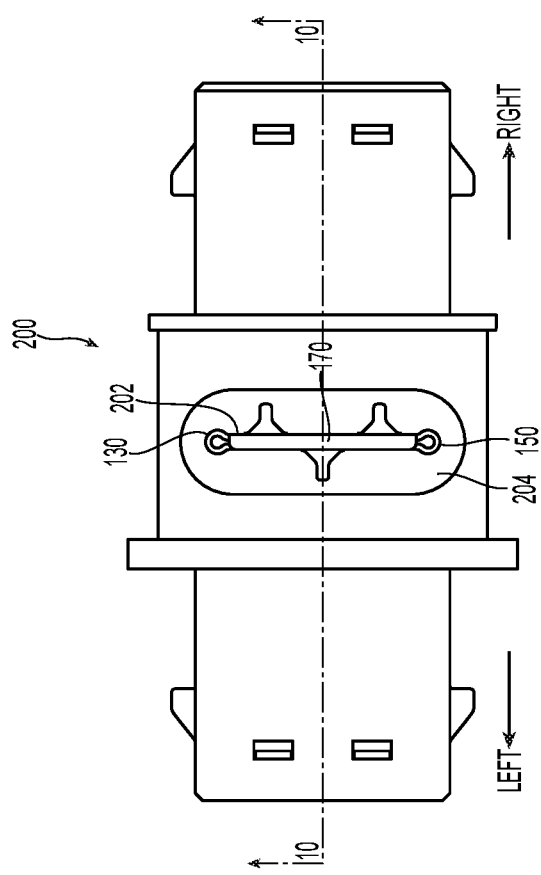
FIG. 9 is a top view of one embodiment of an adapter according to the present invention with the guide pin insert of FIG. 3 disposed therein.
Figure 12:
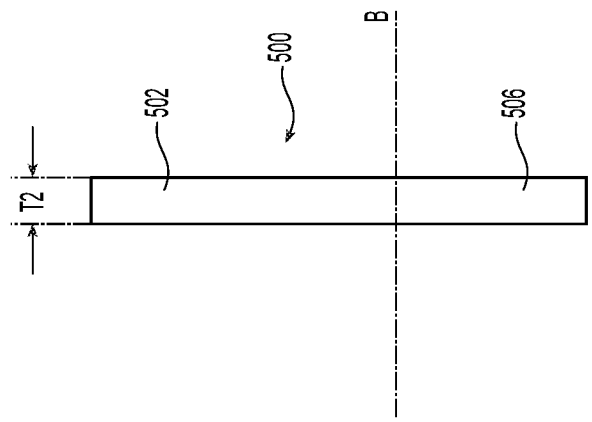
FIG. 12 is a side elevational view of the guide pin insert in FIG. 11.
Figure 11:
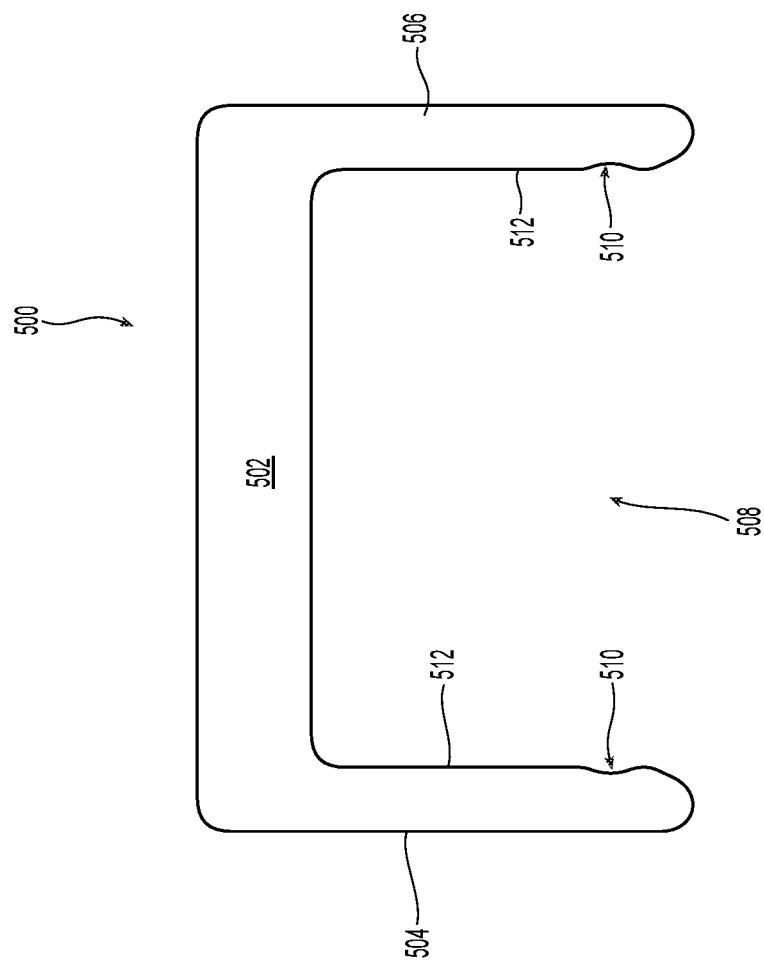
FIG. 11 is a front elevational view of a second embodiment of a guide pin insert for an adapter according to the present invention.

One embodiment of a guide pin insert 130 according to the present invention is illustrated in FIGS. 2-10. As can be appreciated, the guide pin insert 130 is to be inserted into an adapter that preferably mates two fiber optic connectors (such as the MT-style connectors). One such adapter is illustrated in FIGS. 9-10 and is discussed in more detail below. The guide pin insert 130 has a generally flat central body portion 132 that is preferably rectangular with a thickness TI less than the length G of the pin groove 108. The guide pin insert 130 includes an opening 134 in the flat central body portion 132 for mating end faces of fiber optic ferrules that are disposed inside the adapter. The opening 134 may be asymmetrically positioned with respect to the top side 136 and the bottom side 138 of the generally flat body portion 132. For example, the opening 134 may be skewed towards the bottom side 138 and have more area towards the top side 136. See FIGS. 5 and 6. However, the opening 134 could be centralized in the flat central body portion, towards the top side 136, to left side 140 or right side 142 (in FIG. 6, for example). Further, the opening 134 may matching an endface profile of a ferrule, which may or may not be rectangular. There is longitudinal axis A that extends through the guide pin insert 130 and the opening 134. See FIG. 2. It is generally along this longitudinal axis A that the fiber optic connectors are connected as well as the spacing of several of the elements of the guide pin insert 130 as discussed below.

Figure 2:
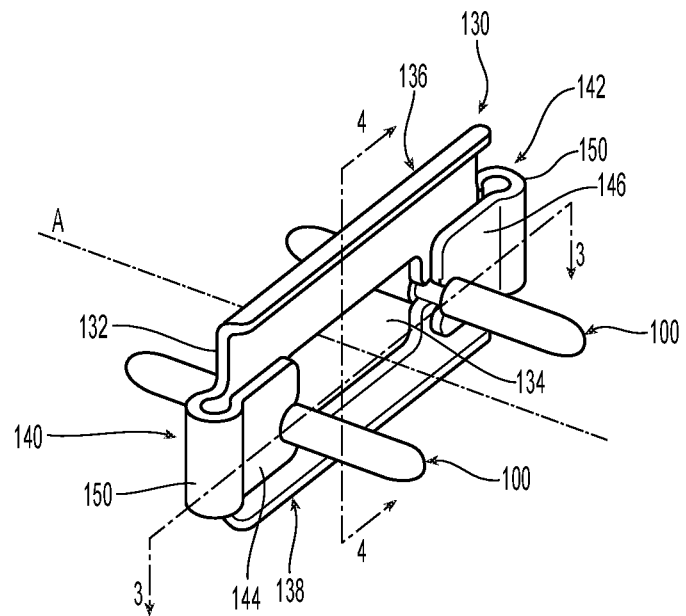
FIG. 2 is a perspective view of one embodiment of a guide pin insert according to the present invention that can be used with the guide pin of FIG. 1.
Figure 4:
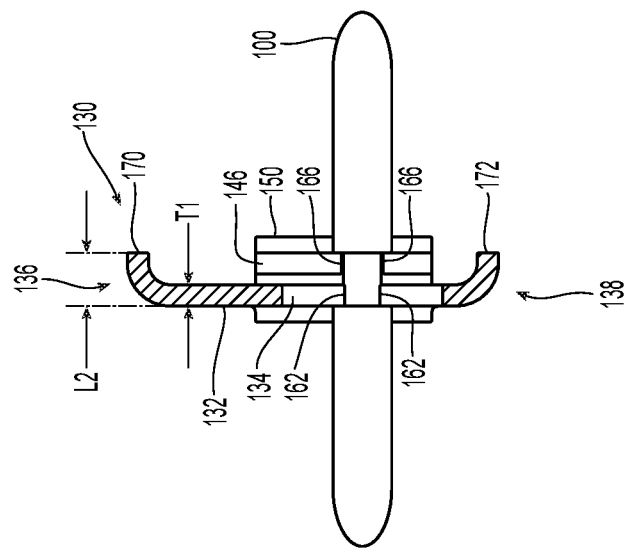
FIG. 4 is a side elevational view of the guide pin insert in FIG. 2 along the lines 4-4 of FIG. 2.
Figure 6:
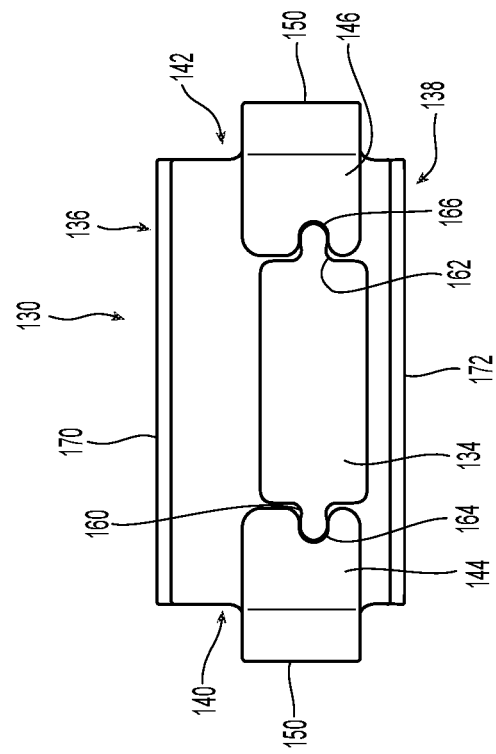
FIG. 6 is a rear elevational view of the guide pin insert of FIG. 2 for use with an adapter.
Figure 5:
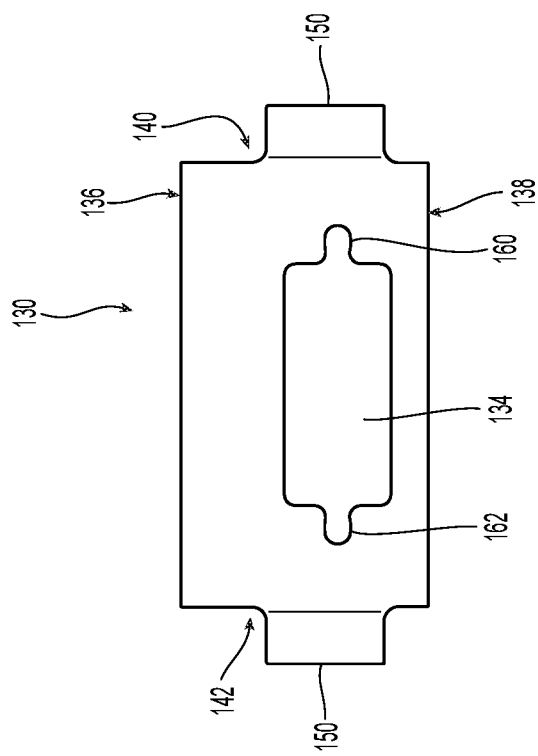
FIG. 5 is a front elevational view of the guide pin insert of FIG. 2 for use with an adapter.

The guide pin insert 130 may also have cantilevered plates that extend from the sides 140,142 of the flat central body portion and may be folded as illustrated in FIGS. 2 and 6. For example, left cantilevered plate 144 extends from the left side 140, while a right cantilevered plate 146 extends from the right side 142. The cantilevered plates 144,146 are folded back towards the opening 134 in the flat central body portion 132. As a result, an elastic member 150 is made by an arcuate or a circular fold that extends from an outward edge of the flat central body portion 132 to the cantilever plates 144,146, which in turn extend toward the opening 134 in the guide pin insert 130. The elastic member 150 acts as a flexible part and, as described in more detail below, when the guide pin insert 130 is inserted into the adapter, the cantilever plates 144,146 compress towards the flat central body portion 132 to hold the guide pins 100 in the guide pin insert 130 at a specific force. Other shapes of the elastic member 150 may also be employed. For example, there may be a u-shaped configuration joining the flat central body portion 132 and the cantilevered plates 144,146.

The guide pin insert 130 has a number of guide pin holders that engage the guide pins 100. There is a first guide pin holder 160 that is on the left side 140 of the guide pin insert 130 and is in communication with the opening 134 in the flat central body portion 132 (see e.g., FIGS. 5 and 6). There is a second guide pin holder 162 that is on the right side 142 of the guide pin insert 130 and is also in communication with the opening 134 in the flat central body portion 132. There are two more guide pin holders, one at the end of each of the cantilever plates 144,146. The third guide pin holder 164 is at the terminal end of the left cantilever plate 144, while the fourth guide pin holder 166 is at the terminal end of the right cantilever plate 146. As can be seen in several of the figures (in particular FIGS. 2-4), the guide pin holders on each side of the opening 134 are spaced from one another along this longitudinal axis A as well. The implementation of this feature is discussed below. Each of the guide pin holders 130 has an opening that generally conforms to the shape of the guide pin groove 108. However, other shapes are possible as long as the guide pins 100 can fit within the guide pin holders 130. In the embodiment illustrated in the figures, the guide pin groove 108 is round and therefore the guide pin holders have a generally rounded opening to receive the guide pin 100 and the guide pin groove 108 in particular therein. If the guide pin groove 108 had a different configuration (i.e., square, rectangular, oval, etc.), it is preferable but not necessary that the guide pin holders would have a corresponding configuration.

Figure 3:
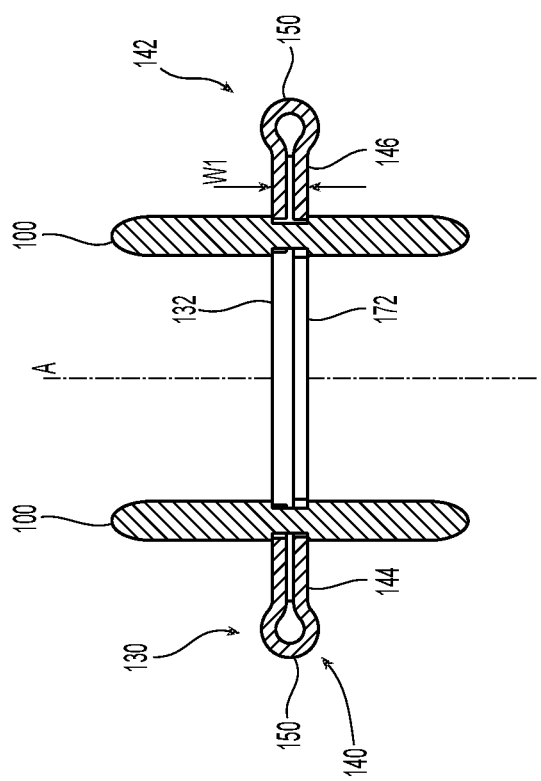
FIG. 3 is a top view of a cross section of the guide pin insert in FIG. 2 along the lines 3-3 of FIG. 2.

The flat central body portion 132 may also have a folded portion 170 at the top side 136 and another folded portion 172 at the bottom side 138. The folded portions 170,172 are preferably a continuation of the flat central body portion 132 and may be folded or bent. Alternatively, they could also be added in a subsequent process. The folded portions 170,172 are used to maintain the orientation of the guide pin insert 130 in the adapter. The length L2 of the folded portions 170,172 generally correspond to the width W1 of the flat central body portion 132 and the cantilever plates as illustrated in FIG. 3. Thus, the rear surface of the flat central body portion 132 and the folded portion 170 maintain the orientation of the guide pin insert 130 along the longitudinal axis A and within a slot in the adapter as explained in more detail below. As noted briefly above and as discussed in detail below, the cantilever plates 144,146 are movable relative to the flat central body portion 132 and therefore are preferably not used to maintain the orientation of the guide pin insert 130 in the slot of the adapter.

Figure 7:
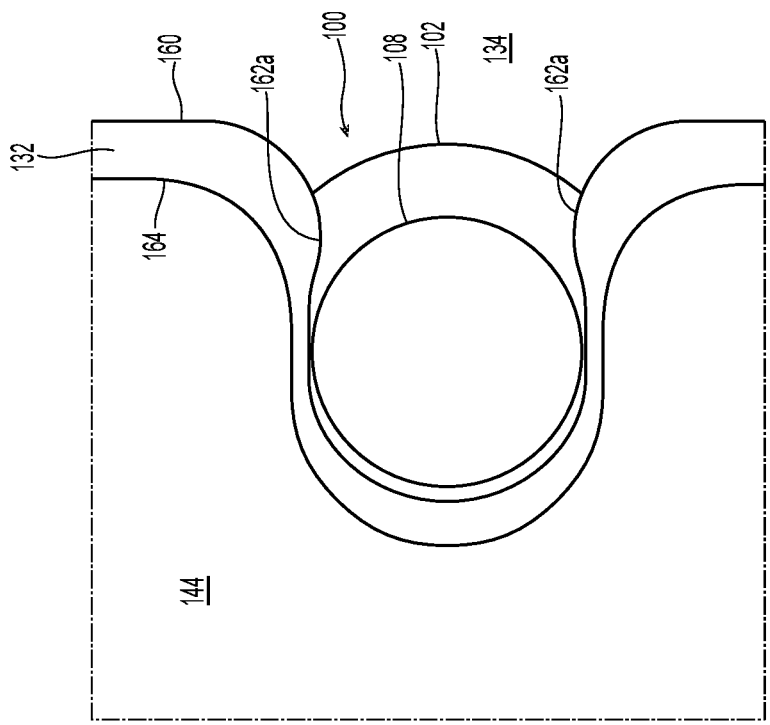
FIG. 7 is a partial, elevational view of a guide pin of FIG. 1 installed in the guide pin insert of FIG. 2.

As illustrated in FIG. 2, the guide pin 100 is inserted into the guide pin holders on either side of the opening 134. The right side 142 is more easily seen in FIG. 2 (and also in FIGS. 5 and 6), thus the discussion below references the right side, but the discussion is equally applicable to the left side 140. In particular, the guide pin 100 is aligned with the second guide pin holder 162 of the guide pin insert 130 through the opening 134 in the flat central body portion 132. The pin groove 108 is dimensioned so as to fit within the guide pin holder 162. As best seen in FIGS. 7 and 8, the second guide pin holder 162 of the guide pin insert 130 has a portion 162a that slightly narrows the second guide pin holder 162 closest to the opening 134—to assist in retaining the guide pin 100 within the second guide pin holder 162. A guide pin 100 also is inserted into the fourth guide pin holder 166, the pin groove 108 being the portion of the guide pin 100 that is disposed therein. While there is no slightly narrowed portion as there is with the second guide pin holder 162 in the fourth guide pin holder 166, it is within the scope of the present invention to include such a feature.

The respective surfaces of the second guide pin holder 162 (rear face of the flat central body portion 132) and the fourth guide pin holder 166 (front face of the cantilever plate 146) preferably engage the transitions 110 on both sides of the pin groove 108 to align and hold the guide pin 100 in the guide pin insert 130. As noted above, the guide pin holders on each side of the opening 134 are spaced from the other guide pin holder on the same side of the opening along the longitudinal axis A. See also FIG. 4. This allows for the guide pin holders to engage the transitions 110 on both sides of the guide pin groove 108. Since two of the guide pin holders are at the end of each of the cantilever plates 144,146, it is possible to control the pressure applied to the transitions 110 by controlling the width W1 along the length of the guide pins and also by controlling the characteristics of the material used to form the guide pin insert and the elastic member 150 in particular.

As visible in FIGS. 7 and 8, the third and fourth guide pin holders 164,166 are preferably larger in circumference than the first and second guide pin holders 160,162. The first and second guide pin holders are used more for the alignment of the guide pins 100 in the adapter and relative to the fiber optic connectors that will be using the guide pins 100. The third and fourth guide pin holders 164,166 provide more of a supporting role and provide a second surface against which transitions 110 can press. The combination of the first and third guide pin holders (160,164) and the second and fourth guide pin holders (162,166) are sufficient to retain and align the guide pins 100 so that the two fiber optic connectors are able to have the guide pins 100 located within guide pin openings in the fiber optic connectors and align the two fiber optic ferrules.

An adapter 200 that is configured to accept the guide pin insert 130 is illustrated in FIGS. 9-10 and corresponds to one embodiment of an adapter that can receive MT-type fiber optic connectors. As known by one of ordinary skill in the art, the MT-style connectors have a fiber optic ferrule, an inner connector housing, and an outer connector housing, although the adapter 200 may accommodate other types of housings for MT ferrule or non-MT ferrule types (e.g, duplex connector ferrules). FIG. 9 is a top view of the adapter 200 that has a slot 202 to receive the guide pin insert 130. The slot 202 is preferably in the center (from each end on the left and right side of the adapter in FIG. 9) so that the fiber optic connectors are mated at the center point and in the opening 134 in the guide pin insert 130. The slot 202 opens to a recessed portion 204 that accepts a stopper 206 that is partially inserted into the slot 202 to retain the guide pin insert 130 in the slot 202 (see FIG. 10). As illustrated, the stopper 206 has a generally t-shaped cross-section with a top portion 208 and a leg portion 210. Preferably the stopper 206 remains in the slot 202 by the leg portion 210 frictionally engaging the adapter 200 on either side of the slot 202. Additionally, as illustrated in FIG. 10, the top portion 208 of the stopper 206 is disposed in a cut-out portion 212 in the top of the adapter 200. As would be understood by one of skill in the art, the cut-out portion 212 is where the adapter clip (not shown) is located, the adapter clip assisting in retaining the adapter 200 in a panel or other device.

A second embodiment of a guide pin insert 500 is illustrated in FIGS. 11-15. The guide pin insert 500 has a top cross member 502 extending between a first leg 504 and a second leg 506. The top cross member 502 and the two legs 504,506 form an opening 508 that will be discussed in detail below. The two legs 504,506 are also flexible/elastic and can flex outwardly away from the opening 508. The guide pin insert 500 preferably has a uniform thickness T2 along a longitudinal axis B (the same axis along which the fiber optic connectors are mated), but may also have differing thicknesses that are accommodated in the adapter or with folded portions as in the first embodiment discussed above. The first leg 504 and the second leg 506 each have a detent 510 on an inside portion 512 of each of the legs 504,506. The detent 510 is used to engage a portion of the guide pin 100 and, in particular, the pin groove 108.

Figure 13:
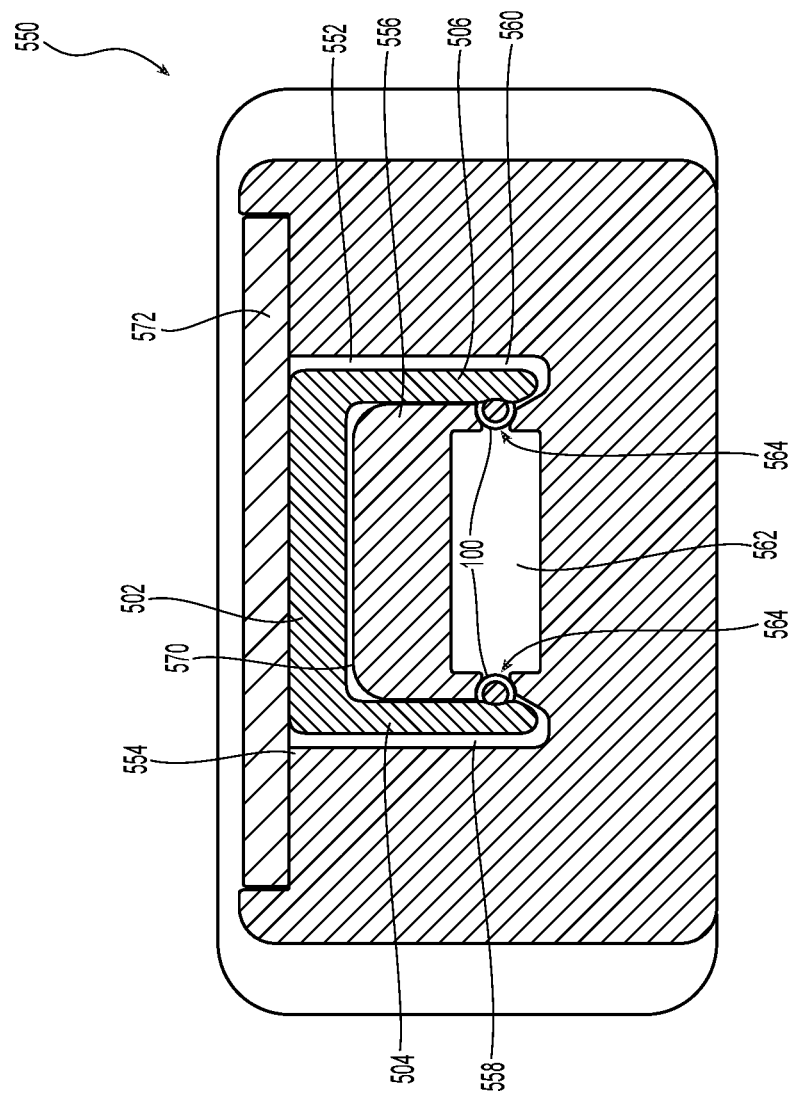
FIG. 13 is a cross sectional view of the guide pin insert of FIG. 11 and guide pins in a second embodiment of an adapter according to the present invention.
Figure 14:
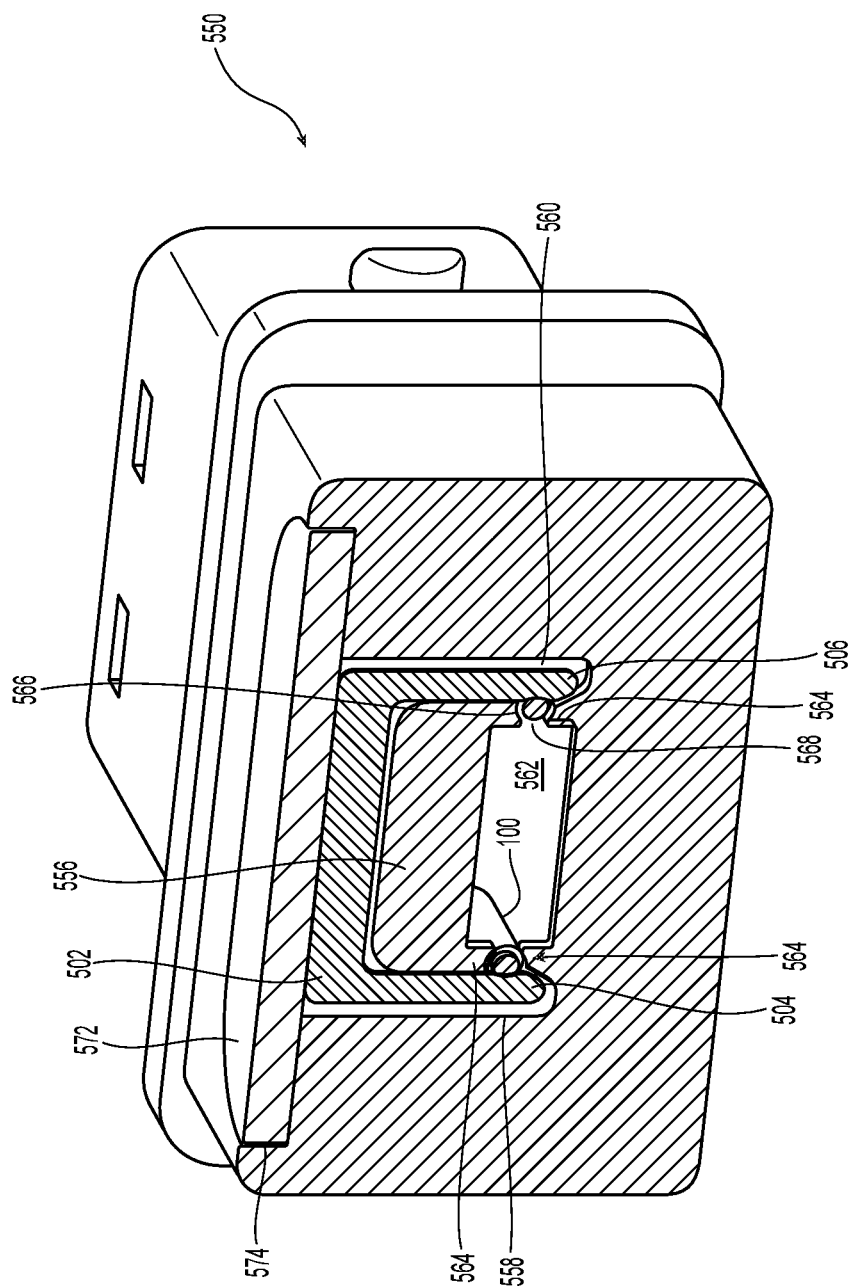
FIG. 14 is a perspective view of a cross section of the guide pin insert, adapter, and guide pins of FIG. 13.
Figure 15:
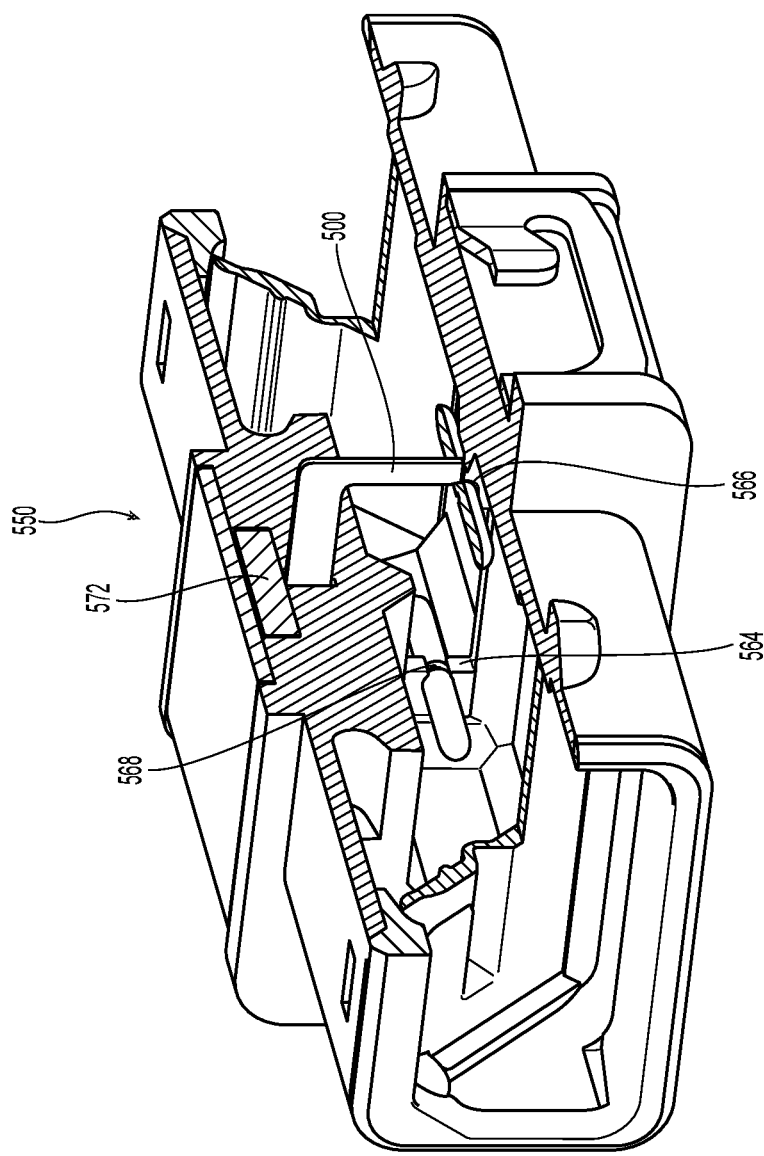
FIG. 15 is a partial cross sectional view of the adapter and guide pin insert with guide pins of FIG. 13.

The guide pin insert 500 is used with the adapter 550 illustrated in FIGS. 13-15. The adapter 550 has a slot 552 extending from a top surface 554 into the adapter 550 to receive the guide pin insert 500. The adapter 550 has a partition 556 that is disposed within the slot 552 and forms two arm slots 558,560. The partition 556 is sized and configured to fit within the opening 508 of the guide pin insert 500. The partition 556 forms a top portion of an ferrule opening 562 that allows the fiber optic ferrules of two fiber optic connectors (not shown) to mate within the adapter 550. The partition 556 has two downward extending portions on each side of the ferrule opening 562 that form a portion of a guide pin holder 564 on each side of the ferrule opening 562. A second portion of the guide pin holder 564 extends upward from below the ferrule opening 562. As best seen in FIG. 15, the guide pin holder 564 is a generally semicircular opening 566 in the adapter 550 to engage the guide pin 100. See also FIG. 14. In this embodiment, the guide pin holders 564 engage the outer surface 112 of the guide pin 100, and not the guide pin groove 108. The guide pin holder 564 has an aperture 568 that extends from the ferrule opening 562 into the generally semicircular opening 566 of the guide pin holder 564. The aperture 568 is not wide enough to allow the guide pin 100 access into the ferrule opening 562. Thus, the guide pins 100 are inserted into the adapter 550 and each of the guide pin holders 564 from outside the ferrule opening 562. The guide pin insert 500 is then inserted into the slot 552 of the adapter 550 and the first leg 504 and the second leg 506 engage the guide pin groove 108 of guide pins 100. In particular, the detent 510 on the inside portions 512 of each of the legs 504,506 engage the guide pin groove 108 and push the guide pins 100 in the guide pin holders 564 toward the ferrule opening 562. Alternatively, the guide pin holder 500 may be inserted in the adapter 550 and then the guide pins 100 can be inserted into the adapter 550. The ends of the guide pins 100 can force the legs 504,506 open (outward) to all the guide pins 100 to be pushed in. The legs 504,506 will then snap into the guide pin groove 108 when they are aligned with each other. In this embodiment, the guide pin groove 108 has a length G that is shorter than in the first embodiment.

As noted above, the legs 504,506 are flexible and the spacing of the legs 504,506, when engaging the guide pins 100, is wider than in an uninstalled condition. Therefore, the legs 504,506 are flexed when in the adapter 550 to bias the guide pins 100 into the guide pin holders 564. Alternatively, the top cross member 502 may provide the flexibility for the legs 504,506 to bias the legs 504,506 into the guide pins 100.

The top cross member 502, when the guide pin insert 500 is installed in the adapter 550, may engage the top 570 of the partition 556. In this manner, the user would know that the guide pin insert 500 is correctly inserted with the detents 510 located adjacent the guide pin holders 564. However, it is also possible that there be some space between the top cross member 502 and the top 570 of the partition 556.

The adapter 550 may also have a stopper 572 that covers the slot 552 and may be inserted into a recessed portion 574.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A guide pin retainer for an adapter to align two fiber optic ferrules comprising:
a central body having an opening configured to allow two fiber optic ferrules to mate therethrough, the opening having a longitudinal axis therethrough;
a first guide pin holder in communication with the opening on a first side of the central body to engage a first guide pin;
a second guide pin holder in communication with the opening on a second side of the central body to engage a second guide pin;
a third guide pin holder spaced from the first guide pin holder along the longitudinal axis to engage the first guide pin; and
a fourth guide pin holder spaced from the second guide pin holder along the longitudinal axis to engage the second guide pin.

2. The guide pin retainer for an adapter to align two fiber optic ferrules according to claim 1, wherein the third guide pin holder is at an end of a first cantilevered plate attached to a first side of the central body and fourth guide pin holder is at an end of a second cantilevered plate attached to a second side of the central body.

3. The guide pin retainer for an adapter to align two fiber optic ferrules according to claim 2, wherein the first and second cantilevered plates are connected to the central body by an elastic portion.

4. The guide pin retainer for an adapter to align two fiber optic ferrules according to claim 1, wherein the guide pin holders have a curved portion into which the guide pins are inserted.

5. The guide pin retainer for an adapter to align two fiber optic ferrules according to claim 4, wherein each of the curved portions of the guide pin holders has a cross section, the cross section of the first and second guide pin holders being smaller than the cross section of the third and fourth guide pin holders.

6. The guide pin retainer for an adapter to align two fiber optic ferrules according to claim 1, wherein the first guide pin holder is configured to engage a groove in the first guide pin and the second guide pin holder is configured to engage a groove in the second guide pin.

7. The guide pin retainer for an adapter to align two fiber optic ferrules according to claim 1, wherein the third guide pin holder is configured to engage a groove in the first guide pin and the fourth guide pin holder is configured to engage a groove in the second guide pin.

8. The guide pin retainer for an adapter to align two fiber optic ferrules according to claim 1, wherein there is a single groove in the first guide pin and a single groove in the second guide pin.

9. The guide pin retainer for an adapter to align two fiber optic ferrules according to claim 1, wherein the first guide pin holder and third guide pin holder engage different grooves in the first guide pin and the second guide pin holder and fourth guide pin holder engage different grooves in the second guide pin.

10. The guide pin retainer for an adapter to align two fiber optic ferrules according to claim 3, wherein the elastic portion is integral with the first and second cantilevered plates and the central body.

* * * * *